United States Patent
Yang et al.

(10) Patent No.: US 9,521,408 B2
(45) Date of Patent: *Dec. 13, 2016

(54) METHOD AND APPARATUS FOR ROUNDING COORDINATE VALUE OF NON-INTEGER PIXEL POSITION MOTION VECTOR

(71) Applicant: Huawei Technologies Co., Ltd., Shenzhen, Guangdong (CN)

(72) Inventors: Mingyuan Yang, Shenzhen (CN); Sixin Lin, Shenzhen (CN); Jiantong Zhou, Shenzhen (CN); Haoping Yu, Bridgewater, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 698 days.

This patent is subject to a terminal disclaimer.

(21) Appl. No.: 13/946,705

(22) Filed: Jul. 19, 2013

(65) Prior Publication Data

US 2013/0315313 A1    Nov. 28, 2013

Related U.S. Application Data

(63) Continuation of application No. PCT/CN2012/070681, filed on Jan. 20, 2012.

(30) Foreign Application Priority Data

Jan. 21, 2011  (CN) .......................... 2011 1 0024401
Jan. 24, 2011  (CN) .......................... 2011 1 0025766

(51) Int. Cl.
H04N 7/34    (2006.01)
H04N 7/36    (2006.01)
(Continued)

(52) U.S. Cl.
CPC ...... *H04N 19/00587* (2013.01); *H04N 19/513* (2014.11); *H04N 19/523* (2014.11); *H04N 19/533* (2014.11); *H04N 19/59* (2014.11)

(58) Field of Classification Search
CPC ............ H04N 19/00587; H04N 19/513; H04N 19/533; H04N 19/523; H04N 19/59
(Continued)

(56) References Cited

U.S. PATENT DOCUMENTS

2003/0194011 A1    10/2003   Srinivasan
2005/0117810 A1     6/2005   Bjontegaard
(Continued)

FOREIGN PATENT DOCUMENTS

CN    1453725 A    11/2003
CN    1589031 A     3/2005
(Continued)

OTHER PUBLICATIONS

International Search Report dated Apr. 26, 2012 in connection with International Patent Application No. PCT/CN2012/070681.

*Primary Examiner* — Hee-Yong Kim

(57) ABSTRACT

The present disclosure provides a method and an apparatus for rounding a coordinate value of a non-integer pixel position motion vector. The method includes: rounding a coordinate value of a non-integer pixel position motion vector, which includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is
(Continued)

determined by a sign of the coordinate value of the non-integer pixel position motion vector in the dimension.

12 Claims, 4 Drawing Sheets

(51) Int. Cl.
*H04N 19/51* (2014.01)
*H04N 19/513* (2014.01)
*H04N 19/533* (2014.01)
*H04N 19/523* (2014.01)
*H04N 19/59* (2014.01)

(58) Field of Classification Search
USPC .................................................. 375/240.16
See application file for complete search history.

(56) References Cited

U.S. PATENT DOCUMENTS

2010/0177827 A1   7/2010  Sroka
2012/0320981 A1* 12/2012  Shimada .............. H04N 19/543
                                                         375/240.16

FOREIGN PATENT DOCUMENTS

| CN | 101431675 A | 5/2009 |
| CN | 101465002 A | 6/2009 |
| CN | 101860747 A | 10/2010 |
| EP | 0 797 357 A2 | 9/1997 |
| EP | 1 359 768 A1 | 11/2003 |
| WO | WO 2005/053312 A1 | 6/2005 |
| WO | WO 2006/131891 A2 | 12/2006 |

* cited by examiner

METHOD AND APPARATUS FOR ROUNDING COORDINATE VALUE OF NON-INTEGER PIXEL POSITION MOTION VECTOR

CROSS-REFERENCE TO RELATED APPLICATIONS

This application is a continuation of International Application No. PCT/CN2012/070681, filed on Jan. 20, 2012, which claims priority to Chinese Patent Application No. 201110024401.7, filed on Jan. 21, 2011 and Chinese Patent Application No. 201110025766.1, filed on Jan. 24, 2011, all of which are hereby incorporated by reference in their entireties.

TECHNICAL FIELD

The present invention relates to the field of communications technologies, and in particular, to a method and an apparatus for rounding a coordinate value of a non-integer pixel position motion vector.

BACKGROUND

Motion prediction and motion compensation are important technologies in video compression. A part of bits in a compressed video bitstream are used to transmit motion vector information. Especially, in the case of a low bit rate, with respect to a high-definition video, bits consumed to transmit motion vector information generally account for over 50% of the total number of bits in a bitstream. Therefore, an optimal motion vector needs to be selected to improve coding efficiency. With respect to video coding of continuous dynamic images, a plurality of continuous images are divided into three types, P, B, and I. With respect to a P-frame, frame data is compressed by prediction according to correlation between the P-frame and a previous adjacent frame (an I-frame or a P-frame). With respect to a B-frame, frame data is compressed by prediction according to correlation between a previous adjacent frame, the B-frame, and a next frame. In view of the difference between the P-frame and the B-frame, during selection of a motion vector, a motion vector set is acquired for the P-frame according to a previous frame thereof only, whereas a motion vector set is acquired for the B-frame according to both a previous frame and a next frame thereof.

A motion vector is used to depict a motion offset relationship between a frame and a reference adjacent frame. To improve accuracy in inter-frame prediction, the prior art employs a non-integer pixel interpolation technology to improve the accuracy in inter-frame prediction. FIG. 1 shows a position relationship of a ½ accuracy pixel or a ¼ accuracy pixel of pixels in an adjacent frame as a reference block in inter-frame prediction. Upper-case letters A/B/C/D/E/F . . . denote integer pixel accuracy positions, and lower-case letters b/h/j/m/t/aa/hh/dd/ee . . . denote ½ accuracy pixel positions, and lower-case letters a/c/d/e/g/i/k/n/p/q/r . . . denote ¼ accuracy pixel positions. The pixel in an integer pixel position is the original pixel of an image. The pixel in a ½ accuracy position and the pixel in a ¼ accuracy position are pixels in non-integer pixel positions acquired by integer pixel interpolation. During interpolation, an interpolation filter is used. For example, a ½ pixel b may be acquired by using an interpolation filter (1, −5, 20, 20, −5, 1)/64 to perform interpolation for integer pixel points D/E/F/G/H/I; and a ¼ accuracy pixel a may be acquired by using an integer interpolation filter (1, 1)/2 to perform interpolation filtering for the integer pixel point F and the ½ pixel point b.

Herein, a B-frame is used as an example. In the prior art, a motion estimation and compensation solution is as follows: Several coding blocks are included in each frame of an image; a spatial candidate motion vector of a coding block is acquired according to motion vectors of neighboring coding blocks (typically the left coding block, the upper left coding block, the upper coding block, and the upper right coding block), and median motion vectors are calculated according to the spatial candidate motion vectors; motion vectors of a coding block in the same position in a previous frame of the coding block, and motion vectors of the four neighboring and eight neighboring coding blocks are acquired, and temporal candidate motion vectors are acquired; one or a plurality of optimal motion vectors are selected, from a candidate motion vector set constituted by the spatial candidate motion vectors, the median motion vectors, and the temporal candidate motion vectors, as a forward motion vector and/or a backward motion vector for motion compensation of the current block. The same process of selecting an optimal motion vector may apply to a coder and a decoder. Therefore, motion vector information does not need to be transmitted, thereby saving bits for transmitting the motion vector information. A typical selection process is: using a corresponding reference block in a forward or backward reference frame which each piece of motion information in a candidate motion vector set of a coding block points to as a template block, using a mirror position of the motion vector information to acquire a block corresponding to the template in the forward or backward reference frame, calculating differences between two templates and the blocks corresponding to the templates (a mean square error or a sum of pixel interpolation absolute values may be used), and selecting the motion information having the smallest difference as an optimal motion vector of the current coding block. Motion prediction and compensation is performed by using the motion vector, to implement coding and decoding.

In the existing solutions, non-integer pixel accuracy motion vectors are centralized in the candidate motion vector set. Therefore, when an optimal motion vector is calculated by using these motion vectors, a large number of sub-pixel interpolation operations need to be performed, resulting in high complexity.

SUMMARY

Embodiments of the present disclosure provide a method and an apparatus for rounding a coordinate value of a non-integer pixel position motion vector to solve the problem of high complexity in selecting an optimal motion vector from a candidate motion vector set in the prior art, and maintain better coding performance.

An embodiment of the present disclosure provides a method for rounding a coordinate value of a non-integer pixel position motion vector, including:

performing a rounding operation on a coordinate value of a non-integer pixel position motion vector, where the rounding operation includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B+ adjacent to the non-integer pixel position in the dimension are the same, where an integer pixel coordinate position is determined by a sign of the coordinate value of the non-integer pixel position motion vector in the dimension.

An embodiment of the present disclosure provides an apparatus for rounding a coordinate value of a non-integer pixel position motion vector, including:

a rounding unit, configured to: perform a rounding operation on a coordinate value of a non-integer pixel position motion vector, where the rounding operation includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension.

In the technical solutions provided by the embodiments of the present invention, a rounding operation is performed on a coordinate value of a non-integer pixel position motion vector, where the rounding operation includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension. By using the preceding technical means, the problem of high complexity in selecting an optimal motion vector from a candidate motion vector set in the prior art is solved and better coding performance is maintained.

BRIEF DESCRIPTION OF DRAWINGS

To illustrate the technical solutions in the embodiments of the present disclosure more clearly, the following briefly introduces the accompanying drawings required for describing the embodiments. Apparently, a person of ordinary skill in the art may still derive other drawings from these accompanying drawings without any creative efforts.

DETAILED DESCRIPTION

Figure 1:
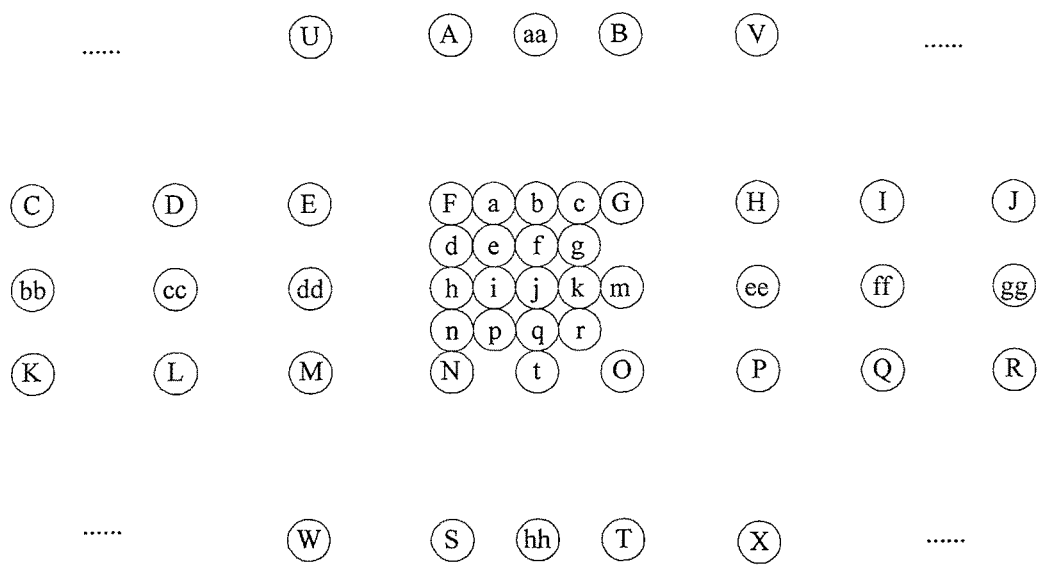
FIG. 1 is a schematic diagram of a motion vector accuracy position.

Embodiments of the present invention provide a method and an apparatus for rounding a coordinate value of a non-integer pixel position motion vector.

To make those skilled in the art better understand the technical solutions of the embodiments of the present invention, and make the objectives, features, and advantages of the embodiments of the present invention more comprehensible, the following further describes the technical solutions of the embodiments of the present invention with reference to accompanying drawings.

Embodiment 1

The embodiment of the present invention provides a method for rounding a coordinate value of a non-integer pixel position motion vector. The method includes: performing a rounding operation on a coordinate value of a non-integer pixel position motion vector, where the rounding operation includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension.

In the technical solution provided by the embodiment of the present invention, a rounding operation is performed on a coordinate value of a non-integer pixel position motion vector, where the rounding operation includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension. By using the preceding technical means, the problem of high complexity in selecting an optimal motion vector from a candidate motion vector set in the prior art is solved and better coding performance is maintained.

In the embodiment of the present invention, if the distances from the coordinate of the non-integer pixel position motion vector in the dimension to the integer pixel coordinate positions A and B adjacent to the non-integer pixel position in the dimension are the same, the coordinate position of the non-integer pixel position motion vector in the dimension is a ½ pixel position. In this case, rounding the coordinate value of the non-integer pixel position motion vector in the dimension to one of integer pixel coordinate positions A and B includes: shifting the coordinate value of the non-integer position motion vector in the dimension right by two bits in the dimension, shifting the same left by two bits, and rounding the coordinate value of the non-integer position motion vector to one of the integer pixel coordinate positions A and B.

In the embodiment of the present invention, determining the integer pixel coordinate position by the sign of the coordinate value of the non-integer pixel position motion vector in the dimension includes:

when the sign of the coordinate value of the non-integer pixel position motion vector is positive, the integer pixel coordinate position acquired by rounding the coordinate value of the non-integer pixel position motion vector being a position with a smaller absolute value from A and B; when the sign of the coordinate value of the non-integer pixel position motion vector is negative, the integer pixel coordinate position acquired by rounding the coordinate value of the non-integer pixel position motion vector being a position with a larger absolute value from A and B; or when the sign of the coordinate value of the non-integer pixel position motion vector is negative, the integer pixel coordinate position acquired by rounding the coordinate value of the non-integer pixel position motion vector being a position with a smaller absolute value from A and B; when the sign of the coordinate value of the non-integer pixel position motion vector is positive, the integer pixel coordinate position acquired by rounding the coordinate value of the non-integer pixel position motion vector being a position with a larger absolute value from A and B.

In some embodiments, if the coordinate position of the non-integer pixel position motion vector in the dimension is a ¼ pixel position instead of a ½ pixel position, rounding the coordinate value of a ¼ pixel position motion vector to an integer pixel accuracy position is rounding the coordinate value of the non-integer pixel position motion vector in the dimension to a closest integer pixel coordinate position.

In some embodiments, before rounding the coordinate value of the non-integer pixel position motion vector, the method further includes: acquiring a candidate motion vector set of a current coding or decoding block, adding a reverse motion vector for a motion vector in the initial candidate motion vector set, and generating a new candidate motion vector set according to the reverse motion vector and the motion vector in the initial candidate motion vector set, to perform a rounding operation.

In the embodiments of the present invention, a ½ pixel position is used as an example to describe the method for rounding the coordinate value of the non-integer pixel position motion vector, which does not constitute a limitation on the present invention. If an integer pixel position is set as a rounding target, a ½ pixel position and/or a ¼ pixel position is rounded to the integer pixel position. In another embodiment, if an integer pixel position and a ½ pixel position are set as rounding targets, the ½ pixel position is regarded as an integer pixel position, and a ¼ pixel position and/or a ⅛ pixel position is rounded to the integer pixel position and the ½ pixel position. In this case, the integer pixel position in the embodiment of the present invention includes the ½ pixel position. According to this idea, those skilled in the art may find it easy and obvious to reach a further extension method.

Embodiment 2

Figure 2A:
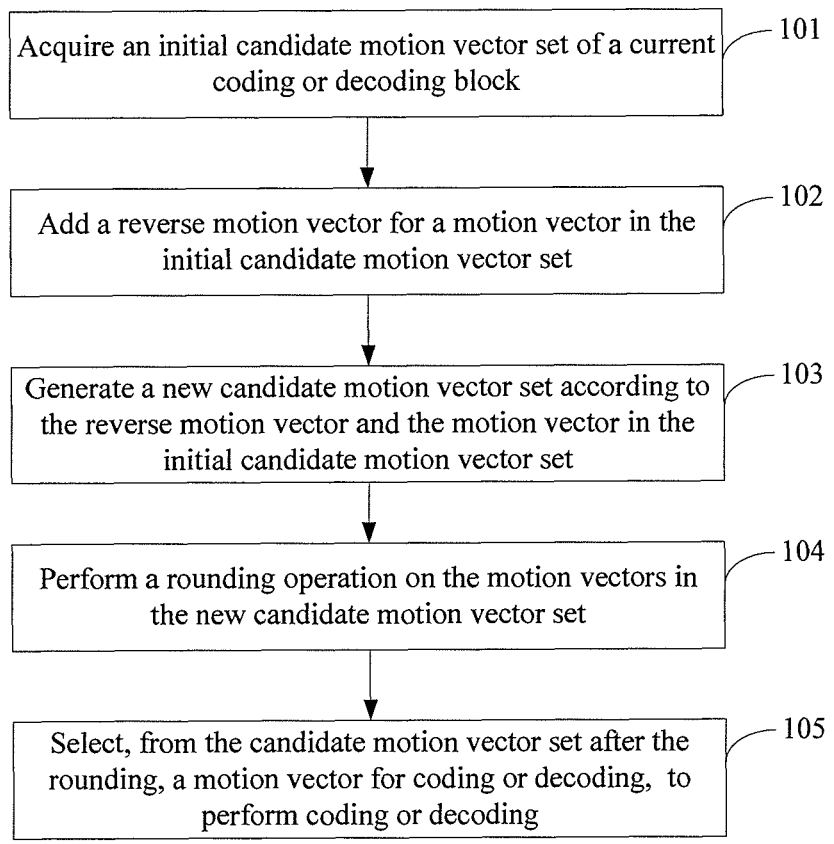
FIG. 2A is a flowchart of a second embodiment of the present invention.

Referring to FIG. 2A, a method for rounding a coordinate value of a non-integer pixel position motion vector according to a second embodiment of the present disclosure is illustrated.

Step 101: Acquire an initial candidate motion vector set of a current coding or decoding block.

Specifically, a spatial candidate motion vector is acquired according to neighboring coding blocks or decoding blocks of the current coding block or decoding block, and a temporal candidate motion vector of the current coding block or decoding block is acquired according to a reference frame. The reference frame may be a previous frame or a next frame, or a previous frame and a next frame of the current frame where the current coding block or decoding block is located. The spatial candidate motion vector and the temporal candidate motion vector constitute an initial motion vector set.

Figure 2B:
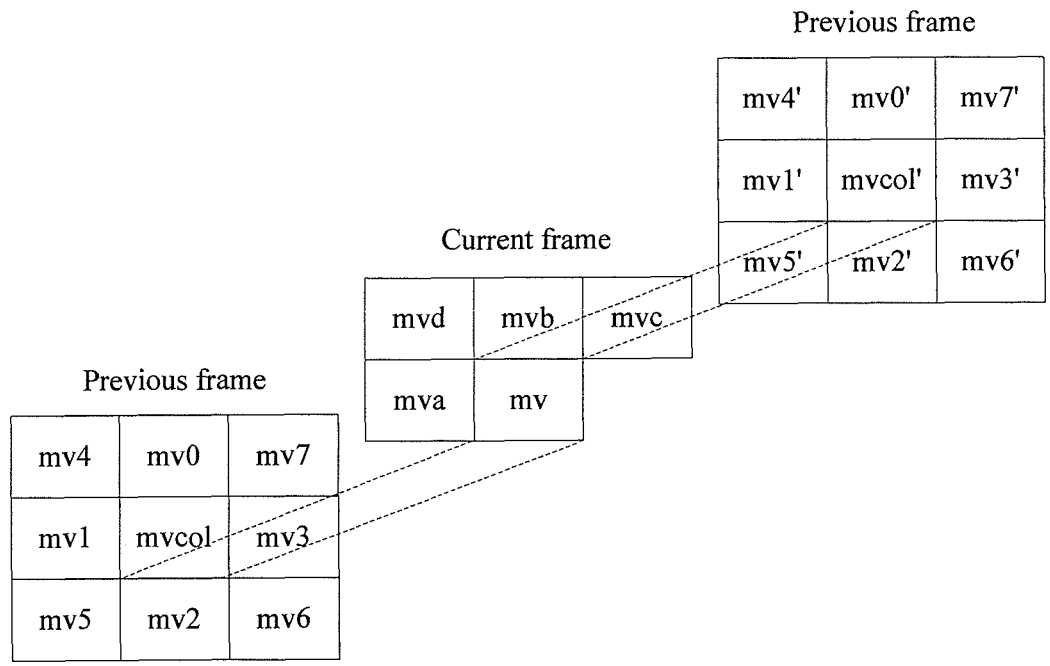
FIG. 2B is a schematic diagram of motion vector selection of a coding block or decoding block in a B-frame according to an embodiment of the present disclosure.

Referring to FIG. 2B, a schematic diagram of motion vector selection of a coding block or decoding block in a B-frame having a bidirectional motion compensation feature is illustrated. Assuming that a coding block or decoding block my in a current frame is a current coding block or decoding block, neighboring coding blocks or decoding blocks of the current coding block or decoding block my generally refer to a left coding block or decoding block $mv_a$, an upper coding block or decoding block $mv_b$, an upper right coding block or decoding block $mv_c$, and an upper left coding block or decoding block $mv_d$ relative to the my illustrated in FIG. 2B, and a spatial candidate motion vector of the current coding block or decoding block my is acquired according to the coding blocks or decoding blocks $mv_a$, $mv_b$, $mv_c$, and $mv_d$. Assuming that a reference frame is the previous frame of the current frame, a coding block or decoding block whose position in the previous frame is corresponding to the current coding block or decoding block my is $mv_{col}$, and four neighboring and eight neighboring coding blocks or decoding blocks corresponding to the $mv_{col}$ are $mv_0$ to $mv_7$, and a temporal candidate motion vector of the my is acquired according to the $mv_{col}$ and the $mv_0$ to $mv_7$. Similarly, a temporal candidate motion vector may also be acquired according to a coding block or decoding block $mv_{col}'$ whose position in the next frame is corresponding to the position of the current coding block or decoding block my and its corresponding four neighboring and eight neighboring coding blocks or decoding blocks $mv_0'$ to $mv_7'$.

Step 102: Add a reverse motion vector for a motion vector in the initial candidate motion vector set.

Specifically, a reverse motion vector may be added for a motion vector in the initial candidate motion vector set according to a preset motion model. The preset motion model includes a uniform linear motion model or an acceleration motion model.

Figure 2C:
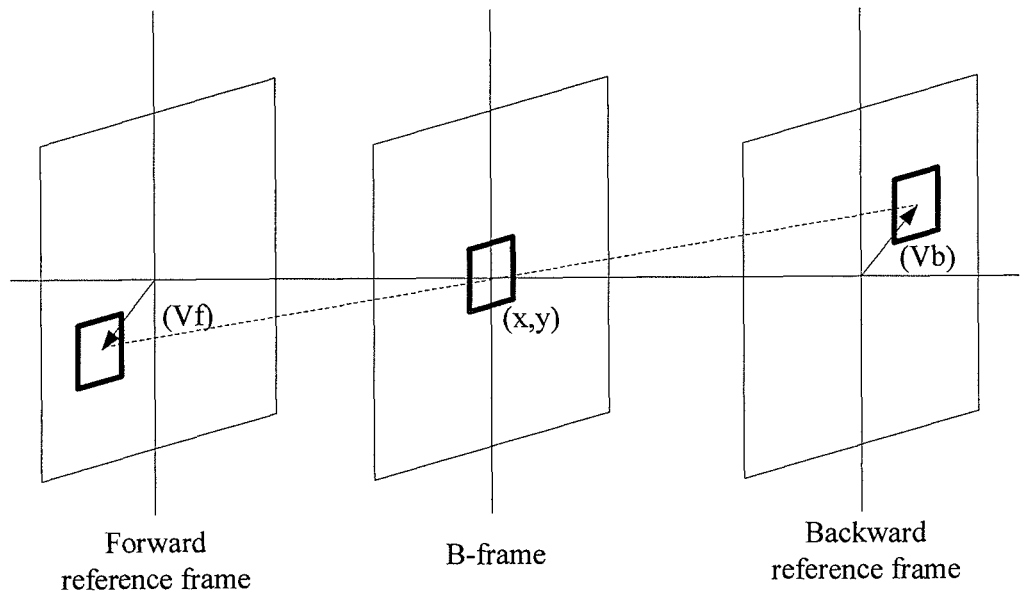
FIG. 2C is a schematic diagram of a B-frame uniform linear motion model according to an embodiment of the present disclosure.

The following uses a uniform linear motion as an example for description. Referring to FIG. 2C, a schematic diagram of a B-frame uniform linear motion model is illustrated. It is assumed that $V_b$ is a backward motion vector, $V_f$ is a forward motion vector, the distance between a B-frame and a forward reference frame is $T_f$, and the distance between the B-frame and a backward reference frame is $T_b$. With respect to the uniform linear motion model illustrated in FIG. 2C, each pair of forward and backward motion vectors satisfy the following equation:

$$V_f/T_f = -V_b/T_b.$$

In addition, besides the uniform linear motion model illustrated in FIG. 2C, an acceleration motion model may also be used. In this case, the two motion vectors $V_f$ and $V_b$ may satisfy the equation $V_f = -(V_b+\alpha)$, where $\alpha$ denotes a speed difference.

The above negate operation may be performed for each of the motion vectors in the initial candidate motion vector set; or may not be performed for a motion vector for which a reverse relationship has been formed in the initial candidate motion vector, but performed for the remaining motion vectors instead.

Step 103: Generate a new candidate motion vector set according to the reverse motion vector and the motion vector in the initial candidate motion vector set.

After reverse motion vectors are added for motion vectors in the initial candidate motion vector set, a forward candidate motion vector set is formed by using the added reverse motion vectors and all forward motion vectors of the motion vectors in the initial candidate motion vector set, and a backward candidate motion vector set is formed by using the added reverse motion vectors and all backward motion vectors.

In addition to the method of forming the forward candidate motion vector set and the backward candidate motion vector set, all forward motion vectors and backward motion vectors may also be included in a new candidate motion vector set. The new candidate motion vector set includes several groups of motion vectors, where each group of motion vectors has corresponding forward motion vectors and backward motion vectors, and each group of corresponding forward motion vector and backward motion vector may be differentiated by identifier information.

Step 104: Perform a rounding operation on the motion vectors in the new candidate motion vector set.

Specifically, with respect to the motion vector in the candidate motion vector set, the rounding operation is performed according to the position of the motion vector. For each dimension of a candidate motion vector, when a coordinate in the dimension is a non-integer pixel position, the coordinate value of a non-integer pixel position motion vector in the dimension is rounded to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension.

Herein, ¼ non-integer pixel accuracy motion estimation and motion compensation are used as an example for description. Referring to a pixel point position relationship as shown in FIG. 1, if a motion vector in the candidate motion vector set points to a position F or G, the motion vector is an integer pixel accuracy motion vector; if a motion vector in the candidate motion vector set points to a position b, the motion vector is a ½ accuracy motion vector; and if a motion vector in the candidate motion vector set points to a position a or c, the motion vector is a ¼ accuracy motion vector. When a motion vector in the candidate motion vector set has integer pixel accuracy, no rounding operation needs to be performed on the motion vector. When a motion vector in the candidate motion vector set has ¼ accuracy, a rounding operation is performed on the motion vector according to a proximity principle. For example, when a motion vector (x1, y1) points to the position a, because two integer pixel positions adjacent to a are F (x2, y2) and G(x3, y3) and the distance from a to F is shorter than the distance from a to G, a is rounded to the position F, and the candidate motion vector (x1, y1) is rounded to (x2, y2). Similarly, c is rounded to the position G. When a motion vector in the candidate motion vector set has ½ accuracy, because the distances from two adjacent integer pixel positions to a position which the motion vector points to are the same, during the rounding, the motion vector needs to be rounded to a different integer pixel position according to a sign of the current motion vector. When the motion vector (x1, y1) points to the ½ pixel position b in FIG. 1, the distance from the integer pixel position F to b and the distance from the integer pixel position G to b are the same. When a rounding operation is performed on b, if the sign of x1 is positive, x-coordinates of the points F and G are positive, and the absolute value of the x-coordinate of the point F is smaller than the absolute value of the x-coordinate of the point G, the coordinate in the x1 dimension of b is rounded to the coordinate x2 of the point F; if the sign of x1 is negative, x-coordinates of the points F and G are negative, and the absolute value of the x-coordinate of the point F is larger than the absolute value of the x-coordinate of the point G, the coordinate in the x1 dimension of b is rounded to the coordinate x2 of the point F. Similarly, when the motion vector (x1, y1) points to the ½ pixel position h in FIG. 1, the distances from the position h to the F (x2, y2) and N (x4, y4) in the direction of the vertical-coordinate are the same; if y1 is positive, the coordinate y1 is rounded to the coordinate y4 of the point N, and if y1 is negative, the coordinate y1 is rounded to the coordinate y4 of the point N. The above rounding process is reversible. To be specific, if the sign of x1 is positive, x-coordinates of the points F and G are positive, and the absolute value of the x-coordinate of the point F is smaller than the absolute value of the x-coordinate of the point G, the coordinate in the x1 dimension of b is rounded to the coordinate x3 of the point G; if the sign of x1 is negative, x-coordinates of the points F and G are negative, and the absolute value of the x-coordinate of the point F is larger than the absolute value of the x-coordinate of the point G, the coordinate in the x1 dimension of b is rounded to the coordinate x3 of the point G.

The above process may be expressed as the following pseudo code. Herein, it is assumed that a motion vector in the motion vector set is MV and that the x-coordinate value and the y-coordinate value of the motion vector are MV_x and MV_y, respectively, and rounding MV_x is used as an example for description. The detailed description is as follows:

```
iTmp = MV_x;
MV_pos = abs(MV_x) & 0x3;
If(MV_pos = =3 | | MV_pos = =1)
{
    iSign = iTmp >= 0 ? 1 : -1;
    iAbs = abs( iTmp );
    iTmp = ((( iAbs + 2 ) >> 2 ) << 2 );
    MV_x = iSign * iTmp ;
}
Else if (MV_pos = =2)
{
    iTmp = ((MV_x >> 2 ) << 2 );
    MV = iTmp;
}
```

The above rounding process is specifically as follows: A rounding operation is performed on the x-coordinate and y-coordinate of the candidate motion vector; using the x-coordinate as an example, whether the current x-coordinate is a ½ pixel or a ¼ pixel is determined according to the lowest two bits of the x-coordinate; the absolute value of the coordinate value of a ¼ pixel position motion vector is calculated, 2 is added, and the coordinate is shifted right by two bits, and then shifted left by two bits to acquire the absolute value of the coordinate in the dimension after the rounding, where the sign of the coordinate in the dimension remains unchanged; the coordinate in the dimension of the coordinate value of a ½ pixel position motion vector is shifted right by two bits, and then shifted left by two bits to acquire the coordinate value in the dimension after the rounding; and no rounding operation is performed on an integer pixel point, or for ease of implementation, a rounding operation may be performed on an integer pixel point.

Step 105: Select, from the candidate motion vector set after the rounding, a motion vector for coding or decoding, to perform coding or decoding.

To be specific, a corresponding reference block in a forward or backward reference frame which each motion vector in a candidate motion vector set of a coding block or decoding block points to is used as a template block, a block corresponding to the template is acquired from the forward or backward reference frame by using a mirror position of the motion vector information, differences between two templates and the blocks corresponding to the templates are calculated, and the motion vector having the smallest difference is selected for use as an optimal motion vector of the current coding block or decoding block. Motion prediction or compensation is performed by using the motion vector, to implement coding and decoding.

In addition, a coding terminal may also complete another coding process by using a selected motion vector. The process is the same as the process in the prior art, which is not described herein.

Embodiment 3

In Embodiment 2, the technical solution of the present invention is described by using a motion prediction and compensation process with ¼ accuracy as an example. The rounding method when the motion prediction and compensation accuracy is a ½ pixel or a ⅛ pixel, or the operation for defining the rounding operation as normalizing a ¼ point and a ⅛ point to a ½ pixel accuracy position and an integer pixel accuracy position is similar to the operation described in Embodiment 2 of the present invention.

The rounding target in the rounding method according to the present disclosure may be extended according to actual system requirements. In the solution according to Embodiment 1, an integer pixel position is set as a rounding target, and ½ pixel position and/or ¼ pixel position is rounded to an integer pixel position.

Alternatively, an integer pixel position and a ½ pixel position are set as the rounding targets, a ½ pixel position is regarded as an integer pixel position, and ¼ pixel position and/or ⅛ pixel position is rounded to an integer pixel position and a ½ pixel position.

Selection of different rounding targets causes different compression performance and complexity, thereby meeting different application requirements.

Embodiment 4

There is another implementation solution for rounding The rounding process described in step 104 in Embodiment 1 may also be the following rounding process expressed by a pseudo code for rounding of the x-coordinate:

```
iTmp = MV_x;
MV_pos = MV_x & 0x3;
if ((MV_ pos = =1) && (MV_x <0))
    MV = MV −1;
else if((MV_ pos = = 3)&&( MV_x >0))
    MV = MV +1;
iTmp = ((MV_x >> 2 ) << 2 );
MV_x = iTmp;
```

The above rounding process is specifically as follows: A rounding operation is performed on the x-coordinate and y-coordinate according to the candidate motion vector; using the x-coordinate as an example, when the lowest two bits of the x-coordinate are 1, and the x-coordinate is a negative value, 1 is subtracted from the x-coordinate; when the lowest two bits of the x-coordinate are 3, and the x-coordinate is a positive value, 1 is added to the x-coordinate; after such operations, the x-coordinate is shifted right by two bits, and then shifted left by two bits to acquire the x-coordinate value after the rounding, thereby completing the rounding process of the x-coordinate.

During the specific implementation, the pseudo code solution in Embodiment 2 and Embodiment 4 is merely an example for illustrating the specific implementation of the rounding method. Apparently, those skilled in the art may easily think of other embodiments based on the embodiments of the present invention. Under the technical conception disclosed in the embodiments of the present invention, software and hardware implementation solutions which can represent the essence of the present invention all fall within the protection scope of the present invention.

Figure 3:
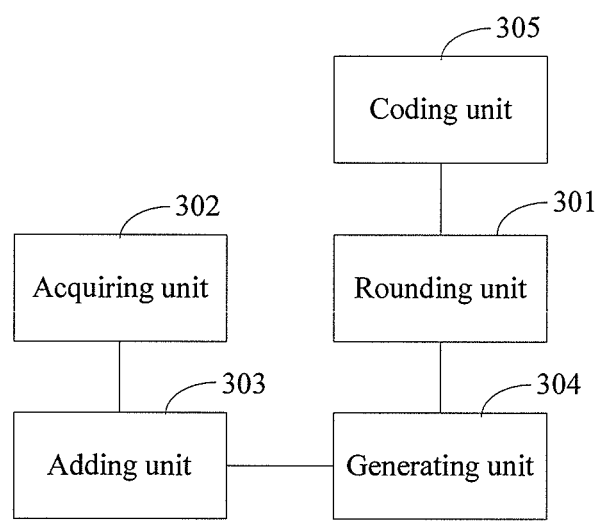
FIG. 3 is a schematic diagram of an apparatus according to an embodiment of the present invention.

Referring to FIG. 3, an embodiment of the present invention provides an apparatus for rounding a coordinate value of a non-integer pixel position motion vector. The apparatus includes:

a rounding unit 301, configured to: perform a rounding operation on a coordinate value of a non-integer pixel position motion vector, where the rounding operation includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension.

Determining the integer pixel coordinate position by the sign of the coordinate value of the non-integer pixel position motion vector in the dimension includes:

when the sign of the coordinate value of the non-integer pixel position motion vector is positive, the integer pixel coordinate position acquired by rounding the coordinate value of the non-integer pixel position motion vector being a position with a smaller absolute value from A and B; when the sign of the coordinate value of the non-integer pixel position motion vector is negative, the integer pixel coordinate position acquired by rounding the coordinate value of the non-integer pixel position motion vector being a position with a larger absolute value from A and B; or when the sign of the coordinate value of the non-integer pixel position motion vector is negative, the integer pixel coordinate position acquired by rounding the coordinate value of the non-integer pixel position motion vector being a position with a smaller absolute value from A and B; when the sign of the coordinate value of the non-integer pixel position motion vector is positive, the integer pixel coordinate position acquired by rounding the coordinate value of the non-integer pixel position motion vector being a position with a larger absolute value from A and B.

In the technical solution provided by the embodiment of the present invention, a rounding operation is performed on a coordinate value of a non-integer pixel position motion vector, where the rounding operation includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension. By using the preceding technical means, the problem of high complexity in selecting an optimal motion vector from a candidate motion vector set in the prior art is solved and better coding performance is maintained.

In some embodiments, the apparatus further includes:
an acquiring unit 302, configured to acquire a candidate motion vector set of a current coding or decoding block;
an adding unit 303, configured to add a reverse motion vector for a motion vector in the initial candidate motion vector set; and
a generating unit 304, configured to generate a new candidate motion vector set according to the reverse motion vector and the motion vector in the initial candidate motion vector set, to perform a rounding operation.

In some embodiments, the apparatus further includes:
a coding unit 305, configured to select, from the candidate motion vector set after the rounding, a motion vector for coding or decoding, to perform coding and decoding.

The apparatus according to the embodiments of the present invention is configured to perform the steps of the method according to the embodiments of the present invention, and the content described in the method embodiments is applicable to the apparatus embodiments.

A person skilled in the art may clearly understand that, the technique in the embodiments of the present invention may be implemented through software plus a necessary general hardware platform. Based on such understanding, the technical solutions in the embodiments of the present invention essentially, or the part contributing to the prior art may be implemented in a form of a software product. The computer software product is stored in a storage medium, such as an ROM/RAM, a magnetic disk, or an optical disk, and includes several instructions for instructing a computer device (which may be a personal computer, a server, or a network device) to perform the methods described in the embodiments of the present invention or in some parts of the embodiments of the present invention.

The embodiments in this specification are all described in a progressive manner, mutual reference may be made to the same or similar part of the embodiments, and the focus in one embodiment is different from the focus in another embodiment. In particular, for a system embodiment, because it is basically similar to the method embodiments, its description is simple, and for the relevant part, reference may be made to the part of the description of the method embodiments.

The foregoing description is about the embodiments of the present invention, but is not intended to limit the protection scope of the present invention. Any modifications, equivalent substitutions and improvements made within the idea and principle of the present invention shall fall within the protection scope of the present invention.

What is claimed is:

1. A method for rounding a coordinate value of a non-integer pixel position motion vector of a frame of digital video data, the method comprising:
performing a rounding operation, by a computer device, on a coordinate value of a non-integer pixel position motion vector of the frame of digital video data, wherein the rounding operation comprises:
for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same,
wherein an integer pixel coordinate position is determined by a sign of the coordinate value of the non-integer pixel position motion vector in the dimension.

2. The method according to claim 1, wherein determining the integer pixel coordinate position by the sign of the coordinate value of the non-integer pixel position motion vector in the dimension comprises:
when the sign of the coordinate value of the non-integer pixel position motion vector is positive, the integer pixel coordinate position acquired by rounding the coordinate value of the non-integer pixel position motion vector being a position with a smaller absolute value from A and B; when the sign of the coordinate value of the non-integer pixel position motion vector is negative, the integer pixel coordinate position acquired by rounding the coordinate value of the non-integer pixel position motion vector being a position with a larger absolute value from A and B; or
when the sign of the coordinate value of the non-integer pixel position motion vector is negative, the integer pixel coordinate position acquired by rounding the coordinate value of the non-integer pixel position motion vector being a position with a smaller absolute value from A and B; when the sign of the coordinate value of the non-integer pixel position motion vector is positive, the integer pixel coordinate position acquired by rounding the coordinate value of the non-integer pixel position motion vector being a position with a larger absolute value from A and B.

3. The method according to claim 1, wherein before rounding the coordinate value of the non-integer pixel position motion vector, the method further comprises:
acquiring a candidate motion vector set of a current coding or decoding block, adding a reverse motion vector for a motion vector in the initial candidate motion vector set, and generating a new candidate motion vector set according to the reverse motion vector and the motion vector in the initial candidate motion vector set, to perform the rounding operation.

4. The method according to claim 1, wherein rounding the coordinate value of the non-integer pixel position motion vector in the dimension to one of the integer pixel coordinate positions A and B comprises:
shifting the coordinate value of the non-integer position motion vector in the dimension right by two bits in the dimension, shifting the same left by two bits, and rounding the coordinate value of the non-integer position motion vector to one of the integer pixel coordinate positions A and B.

5. The method according to claim 1, wherein rounding the coordinate value of the non-integer pixel position motion vector further comprises:

if the coordinate position of the non-integer pixel position motion vector in the dimension is a ¼ pixel position, rounding the coordinate value of the non-integer pixel position motion vector in the dimension to a closest integer pixel coordinate position.

6. The method according to claim 5, wherein rounding a coordinate value of the ¼ pixel position motion vector comprises:
calculating an absolute value of the coordinate in the dimension of the coordinate value of the ¼ pixel position motion vector, adding 2 to the calculated absolute value, shifting the same right by two bits and then left by two bits, and acquiring an absolute value of the rounded coordinate in the dimension, wherein a sign of the coordinate value in the dimension remains unchanged.

7. The method according to claim 3, wherein after rounding the coordinate value of the non-integer pixel position motion vector, the method further comprises:
selecting, from the candidate motion vector set after the rounding, a motion vector for coding or decoding, to perform coding and decoding.

8. The method according to claim 1, wherein rounding the coordinate value of the non-integer pixel position motion vector comprises:
setting an integer pixel position as a rounding target, and rounding a ½ pixel position and/or a ¼ pixel position to the integer pixel position; or setting an integer pixel position and a ½ pixel position as rounding targets, regarding the ½ pixel position as an integer pixel position, and rounding a ¼ pixel position and/or a ⅛ pixel position to the integer pixel position and the ½ pixel position.

9. An apparatus for rounding a coordinate value of a non-integer pixel position motion vector of a frame of digital video data, comprising:
a rounding unit, configured to: perform a rounding operation on a coordinate value of a non-integer pixel position motion vector of the frame of digital video data, wherein the rounding operation comprises:
for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same,
wherein an integer pixel coordinate position is determined by a sign of the coordinate value of the non-integer pixel position motion vector in the dimension.

10. The apparatus according to claim 9, wherein determining the integer pixel coordinate position by the sign of the coordinate value of the non-integer pixel position motion vector in the dimension comprises:
when the sign of the coordinate value of the non-integer pixel position motion vector is positive, the integer pixel coordinate position acquired by rounding the coordinate value of the non-integer pixel position motion vector being a position with a smaller absolute value from A and B; when the sign of the coordinate value of the non-integer pixel position motion vector is negative, the integer pixel coordinate position acquired by rounding the coordinate value of the non-integer pixel position motion vector being a position with a larger absolute value from A and B; or
when the sign of the coordinate value of the non-integer pixel position motion vector is negative, the integer pixel coordinate position acquired by rounding the coordinate value of the non-integer pixel position motion vector being a position with a smaller absolute value from A and B; when the sign of the coordinate value of the non-integer pixel position motion vector is positive, the integer pixel coordinate position acquired by rounding the coordinate value of the non-integer pixel position motion vector being a position with a larger absolute value from A and B.

11. The apparatus according to claim 9, further comprising:
an acquiring unit, configured to acquire a candidate motion vector set of a current coding or decoding block;
an adding unit, configured to add a reverse motion vector for a motion vector in the initial candidate motion vector set; and
a generating unit, configured to generate a new candidate motion vector set according to the reverse motion vector and the motion vector in the initial candidate motion vector set, to perform the rounding operation.

12. The apparatus according to claim 11, further comprising:
a coding unit, configured to select, from the candidate motion vector set after the rounding, a motion vector for coding or decoding, to perform coding and decoding.

* * * * *